United States Patent Office 3,505,411
Patented Apr. 7, 1970

3,505,411
PERFLUOROALKYLENE OXIDE POLYMERS
David E. Rice, St. Paul, Minn., assignor to Minnesota Mining and Manufacturing Company, St. Paul, Minn., a corporation of Delaware
No Drawing. Filed Oct. 11, 1966, Ser. No. 585,772
Int. Cl. C07c 43/00
U.S. Cl. 260—615
1 Claim

ABSTRACT OF THE DISCLOSURE

Polyperfluorooxaalkylene polymers which show good thermal stability are provided having unbranched ($CF_2$)-chains separated by oxygen atoms at intervals of at least three such $CF_2$ groups and having symmetrical terminal groups. Suitable trifunctional cross-linking agents react with the symmetrical terminal groups to give useful cured polymers.

---

This invention relates to a process for production of fluorinated polymers and to polyperfluoroalkylene oxides thereby produced.

The polymers produced by the process of the invention are described essentially by the formula

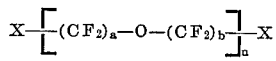

wherein $n$ is an integer from 2 to about 500, $a$ and $b$ are integers whose sum is from 3 to about 20, X is a terminal group selected from the group consisting of I, —$(CF_2)_m COOR$, —$(CF_2)_m COOH$, —$(CF_2)_m CONH_2$, —$(CF_2)_m CN$ and perfluoroalkyl, $m$ is an integer from 1 to 5 and R is lower alkyl or 1,1-dihydroperfluoroalkyl.

These polymers range from oily, or waxy materials, when of lower molecular weight, to resinous or elastomeric solids when of higher molecular weight. They are very resistant toward thermal degradation, and are usefully cross-linked by reaction with suitable polyfunctional compounds to form rubbery non-fluid solid sealants, particularly where high temperatures are encountered in use.

The process of the invention involves subjecting di-iodofluorocarbons, i.e., perfluorooxaalkylene α,ω-diiodides alone or admixed with suitable perfluoroalkylene di-iodides, to ultra-violet radiation in the presence of mercury. Reaction takes place with the formation of mercuric iodide at room temperature or thereabout either in the presence or absence of a suitable diluent such as an inert fluorocarbon liquid. Freedom from monoiodides and hydrogen-yielding compounds is necessary to achieve high molecular weights, e.g. above 25,000.

The perfluoroalkylene diiodides, which enter into the chain, give enhanced values of $a$ and $b$ in the general formula and thereby alter the oxygen content of the polymer. The proportions of perfluoroalkylene diiodides to perfluorooxaalkylene diiodides may be varied from zero up to about 95 percent of the reaction mixture. Chain terminating monoiodides may also be included in the reaction to provide terminating X groups if desired. The resultant terminal groups may be especially suitable for cross-linking. The proportion of monoiodide is maintained below about 40 percent, and preferably from about 5 to 20 percent depending on the desired molecular weight. At ambient temperatures and pressures vigorous agitation and intense ultra-violet irradiations are necessary. Irradiation is effected with light of wavelengths of the order of 2000–4000 A. for times sufficient to provide the energy needed. Light of wavelength 2537 A. is particularly effective in promoting the reaction.

The use of an inert fluorochemical liquid, previously treated to remove any traces of hydrocarbon or hydrofluorocarbon impurities, is advantageous in that mercuric iodide is most readily separated from the polymeric product of the reaction and the reaction is least inhibited. Suitable inert fluorochemicals include perfluorinated cyclic ethers, perfluorohexane, perfluorooctane, perfluorocyclohexane, perfluorotributylamine and the like. Mercuric iodide formed in the reaction is readily removed from the polymer by filtration of the solution. The solution is then concentrated by distilling off the solvent and any unchanged starting materials.

The higher molecular weight polymers are insoluble in and not substantially swelled by the ordinary organic solvents, but are soluble in or swelled by fluorocarbons such as perfluoropentane, perfluoroheptane, perfluorooctane, perfluoroethers, perfluorocyclic ethers and perfluoro polyethers, including the lower molecular weight products of this invention, perfluorotertiary amines, and some halofluorocarbons. When $n$ in the formulae used in the above described reaction is of the order of 10, oily polymers result; when $n$ is substantially larger, solids which are resinous or elastomeric are obtained.

Heating to temperatures of the order of 400° C. appear to produce a certain amount of cross-linking of the polymers. There is no decomposition below about 380° C. and glass temperatures are of the order of —65° C.

The perfluoroalkylene and perfluorooxaalkylene di-iodides employed in the process of the invention for making copolymers and, in the latter case, homopolymers, are available, for example, by reaction of the silver salt of the homologous di acid with iodine at somewhat elevated temperature, thus:

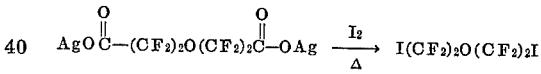

Similar reactions are used to prepare terminating monoiodides i.e. for introducing terminal ester, acid or nitrile groups. This sequence of reactions is illustrated thus:

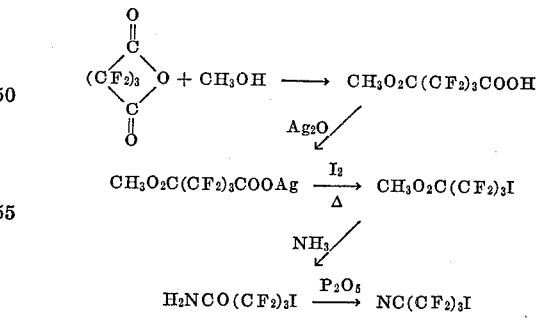

The polymers formed in the process of the invention are characterized by having particular terminal groups, a multiplicity of oxa groups in a polyperfluoromethylene chain and molecular weights from about 500 to about 50,000 or higher. They are usually soluble to some extent in fluorinated solvents and halofluorocarbons such as $CF_2Cl\text{-}CFCl_2$. They are generally insoluble in aliphatic, alicyclic and aromatic hydrocarbons.

A particularly useful feature of the process of the invention is that the properties of the final polymer can be controlled by varying the number of $CF_2$ groups between the oxygens, i.e., the values of $a$ and $b$ in the above formula. This is done either by varying the structure of the ether containing diodide used or by using two or more diiodides of different structures in the reaction. Polymers in which the ratio of $CF_2$ groups to ether linkages is high (i.e. $a+b$ is of the order of 8 to 10 or more) tend to be resinous while those in which the ratio of $CF_2$ groups to ether linkages is low (i.e. $a+b$ is of the order of 3 to 8) tend to be elastomeric and are noncrystalline as shown by X-ray analysis. This is very surprising because polymers having —$CF_2OCF_2$— repeating linkages have been reported (Br. Pat. 987,185) and are apparently crystalline, with melting points above room temperature. Polymers having the —$CF_2OCF_2$— repeating structure and acid or acid derivative end-groups are also known from U.S. Patent 3,250,806. However, chain-extension or crosslinking of these polymers would give rise to structures which would be elastomeric only at relatively high temperatures and thus would be unsuitable for many applications such as sealants for fuel tanks, etc. On the other hand, many of the polymers which are prepared by the process of this invention are elastomeric at temperatures of —50° C. or lower and thus are ideally suited for applications where rubbery properties must be maintained over a wide temperature range.

Polymers terminated by acid groups are obtained by hydrolysis of ester-terminated polymers and are then crosslinked by such polyfunctional crosslinking agents as chromic tris(trifluoroacetate), polyols such as glycerol, pentaerythritol, and the like, ethoxyline resin prepolymers such as cyclopentadiene diepoxide, aromatic trisaziridides such as tributyleneimine trimesamide, and polyisocyanates to give rubbery compositions. The carboxyl-terminated polymers of the invention are also chain-extended and/or crosslinked by polyfunctional amines such as oxydianiline, hexamethylenediamine and diethylenetriamine.

The following examples will more specifically illustrate the best mode contemplated of practicing the invention. All parts are by weight and all temperatures in degrees centigrade unless otherwise specified.

EXAMPLE A

This example illustrates the preparation of alkyl and alkylene iodides as used in the process of the invention.

A mixture of 128 parts (0.42 mole) of 4-oxa-perfluoro heptandioic acid (perfluorooxydipropionic acid) and 100 parts (0.43 mole) of commercial silver oxide in 400 parts of water is refluxed for 7 hours, filtered hot to remove unreacted silver oxide and evaporated to dryness. The residue is dried at 100° C. at 1 mm. of Hg pressure for 3 days and gives 209 parts (0.40 mole) of disilver 4-oxa-perfluoroheptandioate, $O(CF_2CF_2CO_2Ag)_2$.

The above pulverized disilver salt, 47 parts (0.09 mole) is thoroughly mixed with 56 parts (0.22 mole) of finely divided iodine. The resulting grayish powdery mixture is heated to 200° C. in a distilling flask fitted with a receiver cooled with solid carbon dioxide. The crude products of six similar runs are combined, washed with 4 percent aqueous sodium thiosulfate solution to remove the iodine, then washed with water and dried over a neutral drying agent, e.g. calcium sulfate. Distillation through a fractionating column gives 3 - oxa-perfluoropentamethylene diiodide boiling at 138°–142° C. at normal pressures, $n_D^{26}=1.3945$ as a colorless mobile liquid. Purity is determined by vapor phase chromatography to be about 99.1 percent. A sample is further purified by vapor phase chromatographic techniques (using fluorinated silicone polymer supported on diatomaceous earth as the stationary phase) to a purity of 99.98 percent.

The following table lists further fluorocarbon iodides which are produced by the above general procedures. The fluorocarbon acids are obtained by electrofluorination of the hydrocarbon acids and then converted successively to the disilver salts and the iodides. Perfluoroalkylenediiodides are known intermediates.

TABLE

| Hydrocarbon acid | Fluorocarbon acid | Diiodide | B.P. of Diiodide, °C. |
|---|---|---|---|
| $(HO_2C-CH_2)_2O$ | $(HO_2C-CF_2)_2O$ | $(ICF_2)_2O$ | 89–92 |
| $(HO_2C-CH_2CH_2)_2O$ | $(HO_2C-CF_2CF_2)_2O$ | $(ICF_2CF_2)_2O$ | 138–142 |
| $[HO_2C(CH_2)_3]_2O$ | $[HO_2C(CF_2)_3]_2O$ | $[I(CF_2)_3]_2O$ | 168–172 |
| $HO_2C-CH_2-O-CH_2CH_2CO_2H$ | $HO_2C-CF_2-O-CF_2CF_2CO_2H$ | $ICF_2OCF_2CF_2I$ | 112–115 |
| | | $I(CF_2)_3I$ | 131–2 |
| | | $I(CF_2)_4I$ | 149–151 |

EXAMPLE B

This example illustrates the preparation of copolymerizable monoiodides for use in processes of the invention.

Anhydrous methanol, 5.76 parts (0.18 mole), is added slowly with stirring and maintaining the temperature below —15° C. to 40.0 parts (0.18 mole) of perfluoroglutaric anhydride. The temperature of the reaction mixture is permitted to rise to about 25° C. and stirring is maintained for 2 hours.

The resultant monomethyl perfluoroglutarate is taken up in 150 parts by volume of anhydrous diethyl ether and 20.9 parts (0.090 mole) of silver oxide is added in small portions with stirring. Solution of silver oxide occurs and excess is removed by filtration. Silver monomethyl perfluoroglutarate is recovered by evaporation of the ether.

*Analysis.*—Calculated for $C_6N_3F_6O_4Ag$: 30.1% Ag. Found: 31.5% Ag.

By a procedure as described in Example A, 45 parts (0.125 mole) of the silver monomethyl perfluoroglutarate and 37 parts (0.145 mole) of iodine are heated together at 200° C. collecting the product as described above. Methyl ω-iodoperfluorobutyrate is washed and dried and then boils at about 740 mm. Hg pressure at 148°–152° C. $n_D^{25}=1.3930$. The infra-red spectrum is consistent with the structure.

*Analysis.*—Calculated for $C_5F_6H_3IO_2$: 37.8% I. Found: 37.6% I.

EXAMPLE C

A solution of 90 parts (0.27 mole) of methyl ω-iodoperfluorobutyrate in 250 parts by volume of anhydrous diethyl ether is saturated at 0° C. with anhydrous ammonia. After removal of excess ammonia and ether, ω-iodoperfluorobutyramide is obtained as a white residue, M.P. 124°–5° C.

*Analysis.*—Calculated for $C_4F_6H_2NO$: 4.4% N. Found: 4.1% N.

A mixture of about equal weights of phosphoruspentoxide and the above amide is heated in a flask at 150° and the distillate is condensed and collected. After washing with dilute sodium thiosulfate and water and drying, ω-iodoperfluorobutyronitrile is obtained as a liquid boiling at 83° C. at about 740 mm. of Hg pressure. The structure is confirmed by infra-red and nuclear magnetic resonance spectra.

*Analysis.*—Calculated for $C_4F_6IN$: 41.9% I. Found: 41.2% I.

EXAMPLE 1

A fused quartz ampoule is charged with 7.0 parts (0.015 mole) of 3-oxa-perfluoropentamethylene diiodide of 99.1% purity from Example A, 20 parts by volume of perfluorinated solvent boiling at about 100° C. (commercially available under designation FC–75 from Minnesota Mining and Manufacturing Company) and 20 parts by volume (e.g., about 275 parts by weight) of mercury. The ampoule is sealed under vacuum and is then shaken at about 120 cycles per minute under a 100 watt, high pressure mercury lamp giving predominantly light from 2000 to 4000 A. at a distance of about 3 inches for 4 days under ambient temperatures. During this time a red precipitate forms which gradually becomes black as the reaction approaches completion. The ampoule is opened and the contents centrifuged to separate mercury and mercuric iodide. The clear supernatant liquid is evaporated to a transparent rubbery polymer using reduced pressure. This polymer is found to have an inherent viscosity in 100° boiling perfluorinated solvent of 0.20. The number average molecular weight of the polymer as determined by vapor phase osmometry is about 20,000, i.e., $n$ in the above general formula is about 100. The glass transition temperature, as determined by differential thermal analysis is about $-65°$ C. Infra-red and N.M.R. spectra indicate the polymer to consist essentially of repeating units of structure $-(CF_2)_2-O-(CF_2)_2-$. This is confirmed by elemental analysis:

Calculated for $C_4F_8O$: 70.4% F; 22.2% C. Found: 69.5% F; 21.9% C.

X-ray diffraction analysis of the polymer shows it to have no crystallinity. The polymer is terminated by unreacted iodine atoms, i.e. X is I as shown by the $F^{19}$ N.M.R. band at 64.8$\phi$ characteristic of the $-CF_2I$ structure. There is a loss of weight of about 10 percent on heating at 5° C. per minute in air to a temperature of 515° C.

EXAMPLE 2

The procedure of Example 1 is repeated except that time of reaction is reduced to 2 days. The product polymer is a viscous oil containing about 3.8 percent of iodine having inherent viscosity in 100° boiling fluorinated solvent of 0.06 corresponding to a molecular weight of about 4000.

EXAMPLE 3

The procedure of Example 1 is repeated employing 3-oxa-perfluoropentamethylene diiodide of Example A purified to 99.98 percent. The product polymer $$-(CF_2CF_2OCF_2CF_2)_n-$$

is a clear, tacky, elastomer gum having inherent viscosity $<\eta>$ determined as above of 0.30 corresponding to a number average molecular weight $M_n$ of over 40,000, corresponding to $n$ of about 200 in the general formula, refractive index $n_D^{25}=1.3020$ and glass temperature $Tg=-65°$ C.

The thermal stability of the polymer is outstanding for an elastomeric material. No decomposition is noted either in nitrogen or air on thermogravimetric analysis up to 383° C. at which figure there is an exothermic break indicating commencement of decomposition. There is 10 percent weight loss from 515° to 530° C.

EXAMPLE 4

A mixture of 20 parts by volume each of mercury and 100° boiling perfluorinated solvent, 6.0 parts (0.013 mole) of 3-oxa-perfluoropentamethylene diiodide (99.1% purity) and 1.3 parts (0.0026 mole) of perfluoroheptyl iodide is irradiated while shaking at room temperature for 7 days as in Example 1 using a 100 watt high pressure mercury lamp as source for ultra-violet light. Following the procedure of Example 1, the polymer represented by the formula:

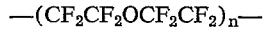

$$C_7F_{15}-\left[(CF_2)_2-O-(CF_2)_2\right]_n-C_7F_{15}$$

where $n$ is about 25 is obtained as a clear oil. The remarkable stability of this oil is demonstrated by bubbling oxygen through it at 315° C. for 150 hours without alteration in properties. It displays a viscosity index of about 148. The structure is confirmed by nuclear magnetic resonance spectra.

EXAMPLE 5

The procedure of Example 1 is repeated employing 5.7 parts (0.01 mole) of 4-oxa-perfluoroheptamethylene diiodide, 4.5 parts (0.01 mole) of 1,4-diiodoperfluorobutane and 20 parts by volume each of mercury and 100° boiling fluorinated solvent. The mixture is shaken in the sealed ampoule for 5 days while irridated by a 325 watt high pressure lamp placed 6 inches away. At the end of this time unreacted mercury is decanted, solvent evaporated and the residue including separated polymer is washed with dilute nitric acid to dissolve mercury salts and finally with water. The dried polymer thus obtained is a white powdery material which does not melt up to 300° C.

EXAMPLE 6

The procedure of Example 1 is repeated using 18.0 parts (0.038 mole) of 3-oxa-perfluoropentamethylene diiodide, 1.3 parts (0.004 mole) of $\omega$-iodoperfluorobutyramide, 15 parts by volume of mercury and 40 parts by volume of 100° boiling perfluorinated solvent all sealed in the ampoule and shaken for 6 days while irradiated at 6 inches from a 325 watt high pressure mercury lamp. Unreacted mercury and precipitated salts are removed and the solution is then evaporated to give the polymer as a clear viscous oil. Infrared absorption spectroscopy confirms the presence of amide groups.

EXAMPLE 7

The procedure of Example 5 is repeated using 7.4 parts (0.02 mole) of 2-oxa-perfluoropropylene diiodide, 2.3 parts (0.005 mole) of 1,4-diiodoperfluorobutane and similar amounts of solvent and mercury. The solution of polymer is separated by centrifugation and evaporated to give a clear somewhat rubbery polymer. The polymer has an inherent viscosity in the 100° boiling fluorinated solvent of about 0.25. The presence of linkages: $-(CF_2)O-(CF_2)_5-$ in the polymer is shown by $F^{19}$ N.M.R. spectroscopy.

EXAMPLE 8

A mixture of 15 parts by volume of mercury, 40 parts by volume of 100° boiling fluorinated solvent, 18.0 parts (0.038 mole) of 3-oxa-perfluoropentamethylene diiodide (99.1% purity) and and 1.3 parts (0.004 mole) of methyl $\omega$-iodoperfluorobutyrate (from Example B) is shaken for 4 days at room temperature within about 7.5 cm. of an ultra-violet source as described in Example 1. The organic phase is then separated and combined with a fresh 15 parts by volume of mercury and shaking and irradiation continued for a further 3 days. The product, an ester-terminated polymer, is recovered as a clear viscous oil using the procedures of Example 1. Infrared absorption spectra show a band at 5.5$\mu$ characteristic of esters of fluorocarbon acids.

To a solution of 7.6 parts of the above ester-terminated polymer in 70 parts by volume of trichlorotrifluoroethane and 15 parts by volume of acetone is added 1 part (a moderate excess) of solid sodium hydroxide. After stirring at room temperature for about 24 hours the sodium hydroxide except for the excess has dissolved and the solvent is evaporated. The residue is taken up in 150 parts by volume of trichlorotrifluoroethane, filtered and then acidified by stirring at reflux for 24 hours with 15 parts by volume of concentrated hydrochloric acid. The organic layer is separated and evaporated. The resultant residue is triturated with perfluorocyclic ether, FC-75, and this solution is then filtered and evaporated to give a clear, very viscous oil which is the polymer

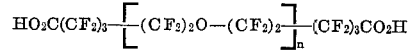

$$HO_2C(CF_2)_3-\left[(CF_2)_2O-(CF_2)_2\right]_n-(CF_2)_3CO_2H$$

in which $n$ is about 25. The presence of terminal

$$-CF_2CO_2H$$

groups is confirmed by an infrared absorption found at 5.6$\mu$. Titration with standard base shows 0.43 milliequivalent of acid per gram. The inherent viscosity in 100° boiling perfluorinated solvent is 0.04.

A 1.0 gram sample of the carboxyl-terminated polymer is mixed with 0.20 gram of chromic tris(trifluoroacetate) and heated at 100° C. for 24 hours to give the chromecrosslinked polymer as a rubbery solid insoluble even in fluorinated solvents.

A further 1.0 gram sample of the same polymer is combined with 0.1 gram of tris butyleneimine trimesamide,

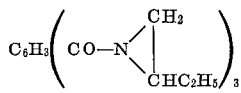

pressed into a thin film and cured by heating at about 95° C. for 24 hours. The cured film is rubbery and no longer tacky. It is insoluble in all ordinary solvents.

The procedure of Example 5 is repeated using 1.2 parts (0.004 mole) of ω-iodoperfluorobutyronitrile as the terminating agent and considerably longer periods for irradiation. The initial reaction mixture is irradiated for 12 days. Further irradiation with 10 parts by volume of fresh mercury is repeated for 7 days after separation of the organic material from the reaction mixture as in Example 5. This is repeated a second time for a further 6 days of irradiation (25 days in all).

At this time the polymer is somewhat gelled and it is extracted with 100° boiling fluorinated solvent. Evaporation of the solvent provides 1.3 parts of tacky, elastomeric gummy polymer, having inherent viscosity in that solvent of 0.05, which is shown to contain terminal nitrile groups by infrared absorption spectroscopy.

The insoluble portion of the polymer (considered to be crosslinked by secondary reactions of nitrile groups) is washed repeatedly with dilute nitric acid to dissolve mercury and mercury compounds and then washed neutral and dried under reduced pressure to give 3.2 parts of rubbery solid polymer. This polymer behaves like a vulcanized rubber in that it does not flow under pressure even at temperatures above 100° C.

EXAMPLE 9

The procedure of Example 1 is repeated employing 0.013 mole (6.0 parts) of 3-oxa-perfluoropentamethylene diiodide and 0.0022 mole (0.9 part) of 1,3-diiodoperfluoropropane in place of the 0.015 mole of the former used in that example. After irradiating for 3 days as above, the organic phase is separated, combined with 15 parts by volume of fresh mercury and irradiated with shaking for a further 2 days. The polymer is worked up and isolated as before and is a clear elastomeric gum. Nuclear magnetic resonance (F$^{19}$) spectroscopy shows numerous absorptions indicative of relatively long sequences of CF$_2$ groups. The polymer is shown to lack crystallinity by X-ray diffraction analysis. The presence of linkages

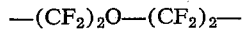

and —(CF$_2$)$_3$—O(CF$_2$)$_5$— is shown in F$^{19}$ N.M.R. spectra. Those skilled in the art will recognize that the values of $a$ and $b$ in the general formula will not necessarily be the same even throughout one polymer molecule because reactions involving two monomers or asymmetric single monomers are subject only to statistical averaging of structures.

What is claimed is:

1. A polyperfluorooxaalkylene polymer, stable against thermal decomposition below about 380° C., having a molecular weight from about 500 to 50,000, and represented esentially by the formula

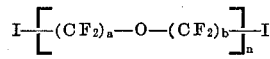

wherein $n$ is an integer from 2 to about 500, and $a$ and $b$ are integers totaling from 3 to about 20.

References Cited

UNITED STATES PATENTS

| | | | |
|---|---|---|---|
| 2,691,038 | 10/1954 | Engelhardt | 260—2 |
| 3,088,958 | 5/1963 | Eleuterio | 260—438.5 |
| 3,115,490 | 12/1963 | Smith | 260—2 |
| 3,125,599 | 3/1964 | Warnell | 260—561 |
| 3,242,218 | 3/1966 | Miller | 260—614 |
| 3,250,806 | 5/1966 | Warnell | 260—535 |
| 3,250,807 | 5/1966 | Fritz et al. | 260—535 |
| 3,250,808 | 5/1966 | Moore et al. | 260—535 |
| 3,274,239 | 9/1966 | Selman | 260—614 |
| 3,317,484 | 5/1967 | Fritz et al. | 260—78.4 |
| 3,351,619 | 11/1967 | Warnell | 260—614 |

FOREIGN PATENTS

| | | |
|---|---|---|
| 672,720 | 5/1952 | Great Britain. |
| 1,410,554 | 8/1965 | France. |
| 1,070,294 | 6/1967 | Great Britain. |

SAMUEL H. BLECH, Primary Examiner

U.S. Cl. X.R.

260—2, 32.6, 33.2, 33.8, 47, 77.5, 430, 465.6, 484, 535, 561, 614, 830; 204—158, 159.11, 163

PO-1050
(5/69)

UNITED STATES PATENT OFFICE
CERTIFICATE OF CORRECTION

Patent No. 3,505,411      Dated April 7, 1970

Inventor(s) David E. Rice

It is certified that error appears in the above-identified patent and that said Letters Patent are hereby corrected as shown below:

Column 3, line 3 "diodide" should read -- diiodide --.
Column 4, line 7 the formula reading "$[I(CF_2)_{32}]_2O$" should read -- $[I(CF_2)_3]_2O$ --. Column 5, line 38 "$M_n$" should read -- $\bar{M}_n$ --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents